US012118949B2

(12) United States Patent
Seo et al.

(10) Patent No.: US 12,118,949 B2
(45) Date of Patent: Oct. 15, 2024

(54) DISPLAY PANEL, DISPLAY DEVICE, AND DISPLAY DRIVING METHOD

(71) Applicant: LG DISPLAY CO., LTD., Seoul (KR)

(72) Inventors: Daeyoung Seo, Seoul (KR); Insu Hwang, Seoul (KR); Hyunsuk Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/973,288

(22) Filed: Oct. 25, 2022

(65) Prior Publication Data

US 2023/0206862 A1 Jun. 29, 2023

(30) Foreign Application Priority Data

Dec. 28, 2021 (KR) ........................ 10-2021-0189923

(51) Int. Cl.

*G09G 3/3291* (2016.01)
*G09G 3/20* (2006.01)
*G09G 3/3225* (2016.01)
*G09G 3/3233* (2016.01)

(52) U.S. Cl.

CPC ......... *G09G 3/3291* (2013.01); *G09G 3/2096* (2013.01); *G09G 3/3225* (2013.01); *G09G 3/3233* (2013.01); *G09G 2300/0842* (2013.01); *G09G 2310/08* (2013.01); *G09G 2320/029* (2013.01); *G09G 2320/0295* (2013.01); *G09G 2320/0666* (2013.01); *G09G 2330/021* (2013.01)

(58) Field of Classification Search

CPC ........... G09G 3/3233; G09G 2320/045; G09G 2320/0295; G09G 2320/029; G09G 2320/0666; G09G 3/2096; G09G 3/3291; G09G 2230/00; G09G 3/3225; G09G 2300/0426

See application file for complete search history.

(56) References Cited

U.S. PATENT DOCUMENTS 11,422,650 B2 * 8/2022 Hwang ................ G09G 3/2092
11,430,395 B2 * 8/2022 Hong ................... G09G 3/3291
2009/0033845 A1 * 2/2009 Tanno ............... G02F 1/134363 349/144
2015/0309360 A1 * 10/2015 Wang ................ G02F 1/133514 345/694
2016/0098960 A1 * 4/2016 Park ..................... G09G 3/3233 345/82
2016/0266452 A1 * 9/2016 Xu .................... G02F 1/134336
2017/0132979 A1 * 5/2017 Oh ....................... G09G 3/3275
2018/0012547 A1 * 1/2018 Li ........................ G09G 3/3266

(Continued)

*Primary Examiner* — Dismery Mercedes

(74) *Attorney, Agent, or Firm* — Morgan, Lewis & Bockius LLP

(57) ABSTRACT

Embodiments of the disclosure relate to a display panel, a display device, and a display driving method. Specifically, there may be provided a display panel including a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line.

15 Claims, 16 Drawing Sheets

(56) References Cited

U.S. PATENT DOCUMENTS

| | | | | |
|---|---|---|---|---|
| 2018/0033373 | A1* | 2/2018 | Hong | G09G 3/3233 |
| 2018/0350303 | A1* | 12/2018 | Jin | G09G 3/3233 |
| 2019/0066590 | A1* | 2/2019 | Li | G09G 3/3233 |
| 2020/0020277 | A1* | 1/2020 | Lee | H10K 50/81 |
| 2020/0335028 | A1* | 10/2020 | Yang | G09G 3/2074 |
| 2021/0201787 | A1* | 7/2021 | Yuan | H10K 59/121 |
| 2021/0375207 | A1* | 12/2021 | Chen | G09G 3/3233 |

* cited by examiner

DISPLAY PANEL, DISPLAY DEVICE, AND DISPLAY DRIVING METHOD

CROSS-REFERENCE TO RELATED APPLICATION

A This application claims priority from Korean Patent Application No. 10-2021-0189923, filed on Dec. 28, 2021, which is hereby incorporated by reference for all purposes as if fully set forth herein.

BACKGROUND

Technical Field

Embodiments of the disclosure relate to a display panel, a display device, and a display driving method capable of efficiently sensing the characteristic values of a driving transistor.

Discussion of the Related Art

As the information society develops, various demands for display devices for displaying images are increasing, and various types of display devices, such as liquid crystal displays (LCDs) and organic light emitting displays, are used.

Among these display devices, the organic light emitting diode display adopts organic light emitting diodes and thus has fast responsiveness and various merits in contrast ratio, luminous efficiency, brightness, and viewing angle.

In such a display device, pixels each having subpixels are arrayed in a matrix pattern on the display panel displaying images. The light emitting element constituting each subpixel is rendered to emit light by controlling the voltage applied to the light emitting element, so that the luminance of each subpixel is controlled, and an image is displayed.

Each subpixel defined on the display panel of the display device has a driving transistor for driving the light emitting element. The characteristic values of the subpixel, such as the threshold voltage or mobility of the driving transistor, may vary depending on the driving time or a deviation in characteristic value may occur due to a difference in driving time between subpixels. A deviation in luminance between subpixels (luminance non-uniformity) may result, degrading image quality.

To address the deviation in luminance between subpixels, there have been proposed techniques for sensing the characteristic values of the subpixel, such as the threshold voltage or mobility of the driving transistor, and compensating for the same.

In particular, the characteristic value sensing of the subpixel is sometimes performed in real-time during the display driving period, which is referred to as a real-time (RT) sensing process. In the real-time sensing process, the sensing process may be performed on one or more subpixels SP in one or more subpixel lines, each blank time, during the display driving period.

However, as the resolution of the display device increases, the sensing time and the compensation time for the subpixel increase. For example, a sensing and compensation time may be required, 1 minute or longer for full high-definition (FHD) display devices, 5 minutes or longer for ultra high-definition (UHD) display devices, and 20 minutes or longer for quantum dot ultra high-definition (QUHD) display devices.

SUMMARY

Accordingly, embodiments of the present disclosure are directed to a display panel, a display device, and a display driving method that substantially obviate one or more of the problems due to limitations and disadvantages of the related art.

An aspect of the present disclosure is to provide a display panel, a display device, and a display driving method capable of effectively sensing the characteristic values of the subpixel.

An aspect of the present disclosure is to provide a display panel, a display device, and a display driving method capable of reducing the characteristic value sensing time by simultaneously sensing characteristic values for subpixels of the same color.

An aspect of the present disclosure is to provide a display panel, a display device, and a display driving method capable of simultaneously sensing characteristic values for subpixels of the same color by symmetrically arranging subpixels of the same color with respect to a reference voltage line.

An aspect of the present disclosure is to provide a display panel, a display device, and a display driving method capable of enhancing the aperture ratio by symmetrically arranging subpixels of the same color with respect to a reference voltage line and omitting a color mixing area between the subpixels of the same color.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display panel comprises a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line.

In another aspect, a display device comprises a display panel including a plurality of pixels arranged in a matrix form, each of the plurality of pixels including N subpixels arranged in a first direction and having different colors, wherein N is 3 or 4, a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line, a data driving circuit configured to supply a data voltage to the display panel and sense the characteristic values for the plurality of subpixels through the plurality of sensing lines, and a timing controller configured to control the data driving circuit and apply compensation image data to a corresponding subpixel using the characteristic values sensed by the data driving circuit.

In another aspect, a method for driving a display device including a display panel including a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line, comprises disposing the subpixels of the same color to be symmetrical with respect to the sensing line, simultaneously sensing characteristic values for the subpixels of the same color to which the sensing line is connected, averaging the characteristic values for the subpixels of the same color, and compensating for a characteristic value for a subpixel of a corresponding color using the average value of the characteristic values.

According to embodiments of the disclosure, there may be provided a display panel, a display device, and a display driving method capable of effectively sensing the characteristic values of the subpixel.

According to embodiments of the disclosure, there may be provided a display panel, a display device, and a display driving method capable of reducing the characteristic value sensing time by simultaneously sensing characteristic values for subpixels of the same color.

According to embodiments of the disclosure, there may be provided a display panel, a display device, and a display driving method capable of simultaneously sensing characteristic values for subpixels of the same color by symmetrically arranging subpixels of the same color with respect to a reference voltage line.

According to embodiments of the disclosure, there may be provided a display panel, a display device, and a display driving method capable of enhancing the aperture ratio by symmetrically arranging subpixels of the same color with respect to a reference voltage line and omitting a color mixing area between the subpixels of the same color.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
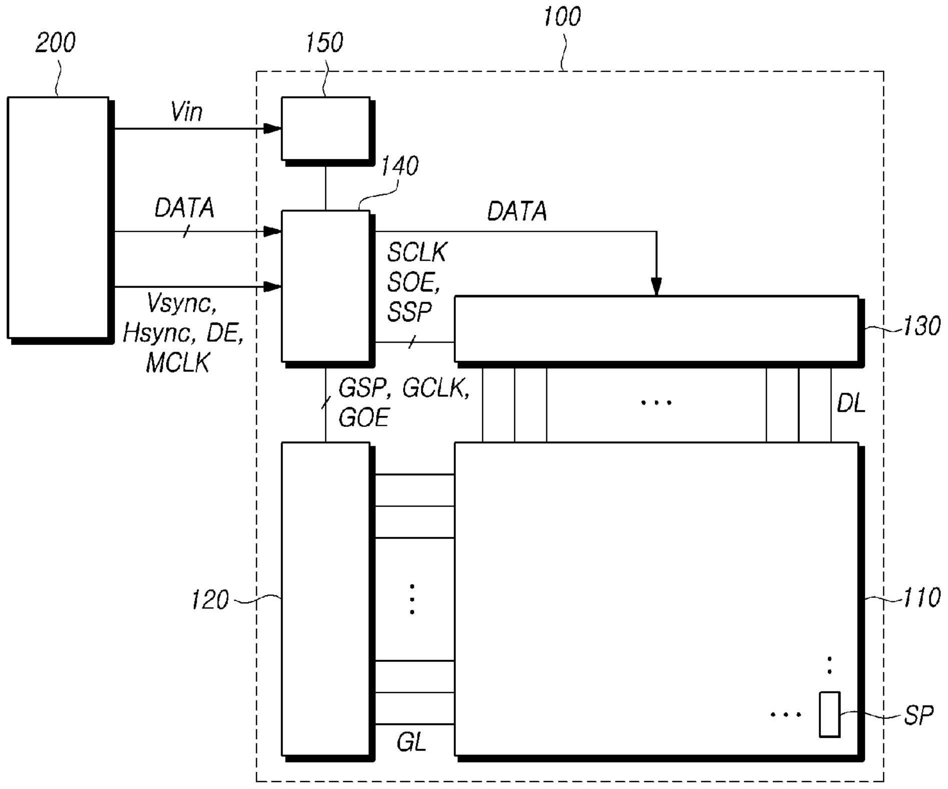
FIG. 1 is a view schematically illustrating a configuration of a display device according to various embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a configuration of a display device according to various embodiments of the disclosure;

Referring to FIG. 1, a display device 100 according to an embodiment of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a scan signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed at the intersection between the gate line GL and the data line DL.

The gate driving circuit 120 may be controlled by the controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160th gate line may be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

Accordingly, the timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power required to drive the display panel 100, the gate driving circuit 120, and the data driving circuit 130.

The subpixel SP is positioned at the intersection between the gate line GL and the data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting diode displays, or plasma display panels.

Figure 2:
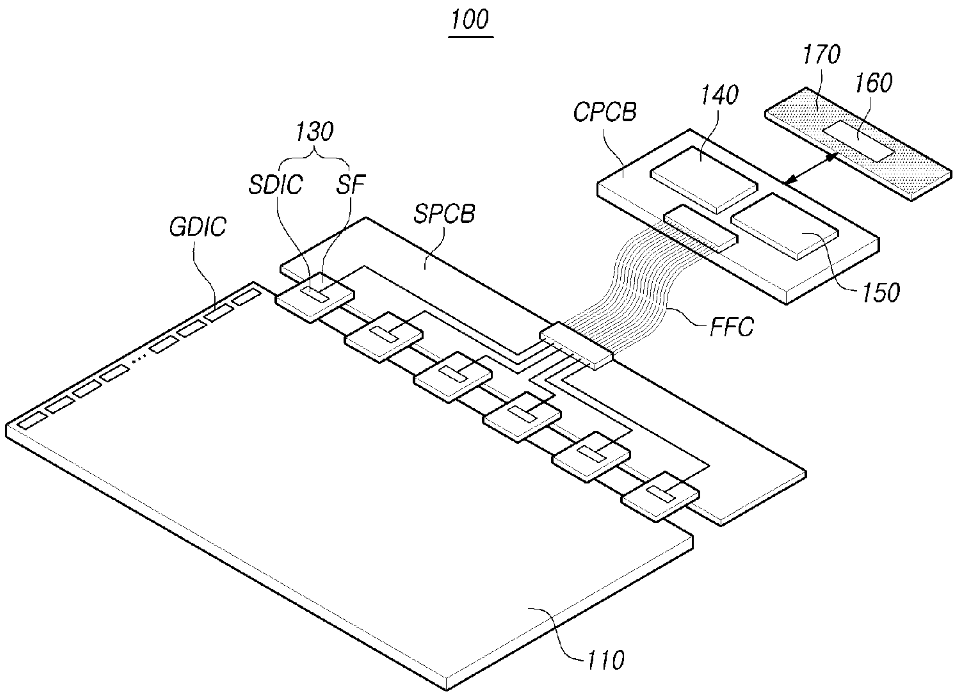
FIG. 2 is a view illustrating an example of a system of a display device according to embodiments of the disclosure.

FIG. 2 is a view illustrating an example of a system of a display device according to embodiments of the disclosure;

Referring to FIG. 2, in the display device 100 according to embodiments of the disclosure, the source driving integrated circuit SDIC included in the data driving circuit 130 is implemented in a chip-on-film (COF) type among various types (e.g., TAB, COG, or COF), and the gate driving circuit 120 is implemented in a gate-in-panel (GIP) type among various types (e.g., TAB, COG, COF, or GIP).

When the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock signal, a gate high signal, a gate low signal, etc.) necessary for generating scan signals through gate driving-related signal lines disposed in the bezel area.

Likewise, one or more source driving integrated circuits SDIC included in the data driving circuit 130 each may be mounted on the source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit (power management IC) 150 may be mounted on the control printed circuit board CPCB. The timing controller 140 may control the operation of the data driving circuit 130 and the gate driving circuit 120. The power management circuit 150 may supply power voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The display device 100 may further include a set board 170 electrically connected to the control printed circuit board CPCB. In this case, the set board 170 may also be referred to as a power board. A main power management circuit (M-PMC) 160 for managing the overall power of the display device 100 may be disposed on the set board 170. The main power management circuit 160 may interwork with the power management circuit 150.

In the so-configured display device 100, the power voltage is generated in the set board 170 and transferred to the power management circuit 150 in the control printed circuit board CPCB. The power management circuit 150 transfers a power voltage necessary for display driving or characteristic value sensing to the source printed circuit board SPCB through the flexible printed circuit FPC or flexible flat cable FFC. The power voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the organic light emitting diode.

The type and number of circuit elements constituting each subpixel SP may be varied depending on functions to be provided and design schemes.

Figure 3:
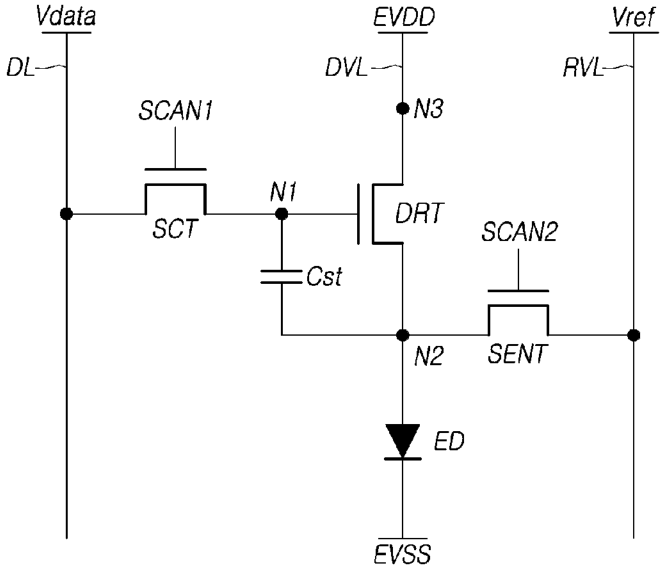
FIG. 3 is a view illustrating an example of a subpixel circuit of a display device according to embodiments of the disclosure.

FIG. 3 is a view illustrating an example of a subpixel circuit of a display device according to embodiments of the disclosure.

Referring to FIG. 3, in the display device 100 according to embodiments of the disclosure, the subpixel circuit may include one or more transistors and a capacitor and may have a light emitting element disposed therein.

For example, the subpixel circuit may include a driving transistor DRT, a scan transistor SCT, a sensing transistor SENT, a storage capacitor Cst, and a light emitting element ED.

The driving transistor DRT includes the first node N1, second node N2, and third node N3. The first node N1 of the driving transistor DRT may be a gate node to which the data voltage Vdata is applied from the data driving circuit 130 through the data line DL when the scan transistor SCT is turned on.

The second node N2 of the driving transistor DRT may be electrically connected with the anode electrode of the light emitting element ED and may be the source node or drain node.

The third node N3 of the driving transistor DRT may be electrically connected with the driving voltage line DVL to which the driving voltage EVDD is applied and may be the drain node or the source node.

In this case, during a display driving period, a driving voltage EVDD necessary for displaying an image may be supplied to the driving voltage line DVL. For example, the driving voltage EVDD necessary for displaying an image may be 27V.

The scan transistor SCT is electrically connected between the first node N1 of the driving transistor DRT and the data line DL, and the gate line GL is connected to the gate node. Thus, the scan transistor SWT is operated according to the first scan signal SCAN1 supplied through the gate line GL. When turned on, the scan transistor SCT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the second scan signal SCAN2 supplied through the gate line GL. When the sensing transistor SENT is turned on, a reference voltage Vref supplied through the reference voltage line RVL is transferred to the second node N2 of the driving transistor DRT.

In other words, as the scan transistor SCT and the sensing transistor SENT are controlled, the voltage of the first node N1 and the voltage of the second node N2 of the driving transistor DRT are controlled, so that the current for driving the light emitting element ED may be supplied.

The gate nodes of the scan transistor SCT and the sensing transistor SENT may be commonly connected to one gate line GL or may be connected to different gate lines GL. An example is shown in which the scan transistor SCT and the sensing transistor SENT are connected to different gate lines GL in which case the scan transistor SCT and the sensing transistor SENT may be independently controlled by the first scan signal SCAN1 and the second scan signal SCAN2 transferred through different gate lines GL.

On the other hand, when the scan transistor SCT and the sensing transistor SENT are connected to one gate line GL, the scan transistor SCT and the sensing transistor SENT may be simultaneously controlled by the first scan signal SCAN1 or the second scan signal SCAN2 transferred through one gate line GL, and the aperture ratio of the subpixel SP may increase.

The transistor disposed in the subpixel circuit may be an N-type transistor or a P-type transistor and, in the shown example, the transistor is an N-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a base voltage EVSS may be applied to the cathode electrode of the light emitting element ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The scan transistor SCT and the sensing transistor SENT may be referred to as switching transistors controlled through scan signals SCAN1 and SCAN2.

The structure of the subpixel SP may further include one or more transistors or, in some cases, further include one or more capacitors.

In this case, to effectively sense a characteristic value, e.g., threshold voltage or mobility, of the driving transistor DRT, the display device 100 may use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel. Thus, the reference voltage line RVL may also be referred to as a sensing line or a sensing channel.

More specifically, the characteristic value or a change in the characteristic value of the driving transistor DRT may correspond to a difference between the gate node voltage and the source node voltage of the driving transistor DRT.

The compensation for the characteristic value of the driving transistor DRT may be performed by external compensation that senses and compensates for the characteristic value of the driving transistor DRT using an external compensation circuit or internal compensation that senses and compensates for the characteristic value of the driving transistor DRT inside the subpixel SP, rather than using an additional external configuration.

In this case, the external compensation may be performed before the display device 100 is shipped out, and the internal compensation may be performed after the display device 100 is shipped out. However, internal compensation and external compensation may be performed together even after the display device 100 is shipped out.

Figure 4:
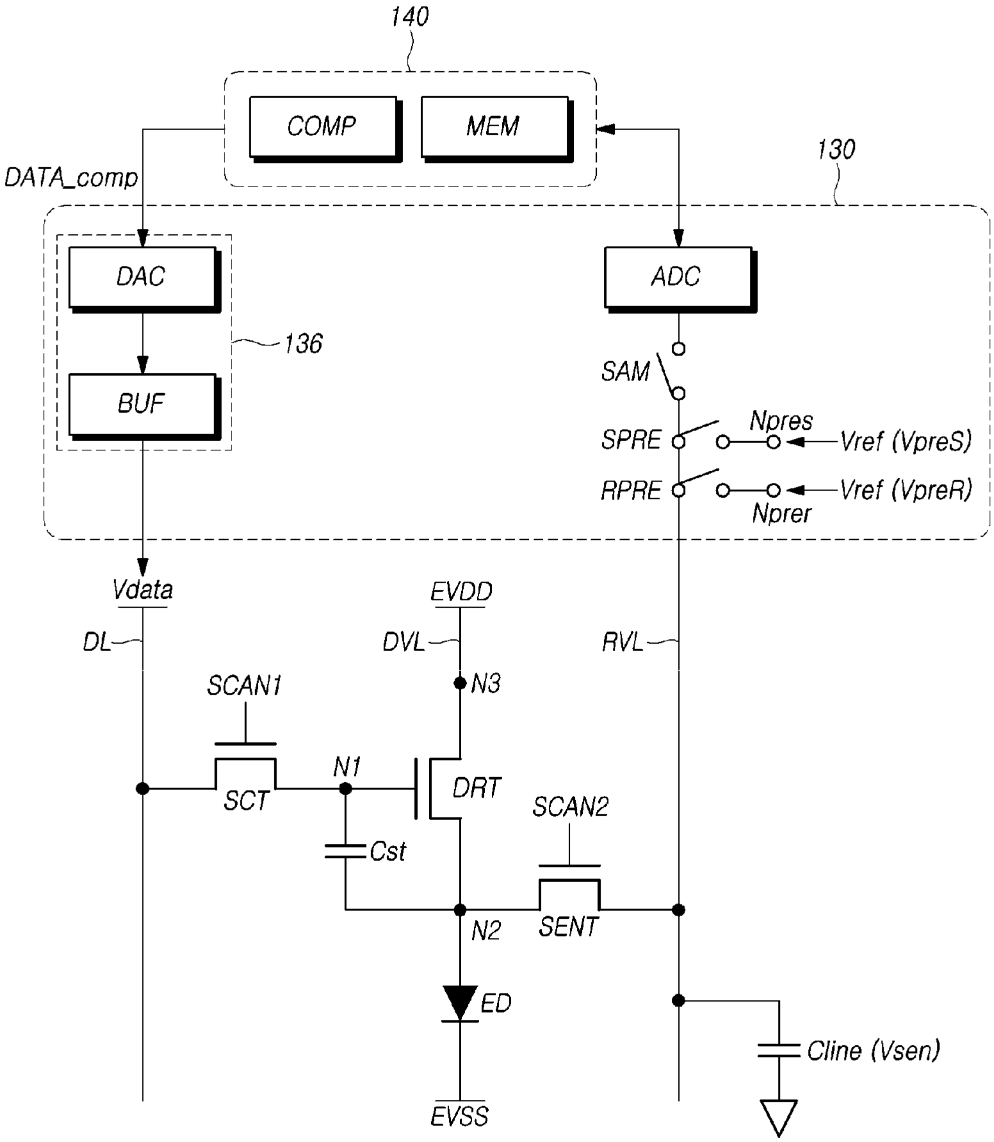
FIG. 4 is a view illustrating an example circuit structure of sensing a characteristic value of a driving transistor in a display device according to embodiments of the disclosure.

FIG. 4 is a view illustrating an example circuit structure of sensing a characteristic value of a driving transistor in a display device according to embodiments of the disclosure.

Referring to FIG. 4, a display device 100 according to embodiments of the disclosure may include components for compensating for a deviation in the characteristic value of the driving transistor DRT.

For example, in the sensing period of the display device 100, the characteristic value or a change in the characteristic value of the driving transistor DRT may be applied as the voltage (e.g., Vdata−Vth) of the second node N2 of the driving transistor DRT. The voltage of the second node N2 of the driving transistor DRT may correspond to the voltage of the reference voltage line RVL when the sensing transistor SENT is in the turned-on state. The line capacitor Cline on the reference voltage line RVL may be charged by the voltage of the second node N2 of the driving transistor DRT. The reference voltage line RVL may have a voltage corresponding to the voltage of the second node N2 of the driving transistor DRT due to the sensing voltage Vsen charged to the line capacitor Cline.

The display device 100 may include an analog-to-digital converter ADC that measures the voltage of the reference voltage line RVL corresponding to the voltage of the second node N2 of the driving transistor DRT and converts the voltage into a digital value and switch circuits SAM, SPRE for sensing the characteristic value.

The switch circuit SAM and SPRE for controlling the sensing driving may include a sensing reference switch SPRE for controlling the connection between each reference voltage line RVL and the sensing reference voltage supply node Npres to which the reference voltage Vref is supplied and a sampling switch SAM for controlling the connection between each reference voltage line RVL and the analog-to-digital converter ADC. The sensing reference switch SPRE is a switch for controlling sensing driving, and the reference voltage Vref supplied to the reference voltage line RVL by the sensing reference switch SPRE becomes the sensing reference voltage VpreS.

The switch circuit for sensing the characteristic value of the driving transistor DRT may include a display reference switch RPRE for controlling display driving. The display reference switch RPRE may control the connection between each reference voltage line RVL and the display reference voltage supply node Nprer to which the reference voltage Vref is supplied. The display reference switch RPRE is a switch used to drive the display, and the reference voltage Vref supplied to the reference voltage line RVL by the display reference switch RPRE corresponds to the display reference voltage VpreR.

In this case, the sensing reference switch SPRE and the display reference switch RPRE may be separately provided or may be integrated into one. The sensing reference voltage VpreS and the display reference voltage VpreR may have the same voltage value or different voltage values.

The timing controller 140 of the display device 100 may include a memory MEM for storing the data transferred from the analog-to-digital converter ADC or previously storing a reference value and a compensation circuit COMP that compares the reference value stored in the memory MEM and the received data and compensates for the deviation in characteristic value. In this case, the compensation value calculated by the compensation circuit COMP may be stored in the memory MEM.

Accordingly, the timing controller 140 may compensate for the image data DATA to be supplied to the data driving circuit 130 by using the compensation value calculated by the compensation circuit COMP and may output the compensated image data DATA_comp to the data driving circuit 130. Accordingly, the data driving circuit 130 may convert the compensated image data DATA_comp into an analog signal type of data voltage Vdata through a digital-to-analog converter DAC and output the converted data voltage Vdata to the data line DL through an output buffer BUF. As a result, the deviation in characteristic value (e.g., deviation in threshold voltage deviation or deviation in mobility) for the driving transistor DRT in the corresponding subpixel SP may be compensated.

As described above, the period for sensing the characteristic values (threshold voltage and mobility) of the driving transistor DRT may be performed after the power-on signal is generated and before the display driving starts. For example, if a power-on signal is applied to the display device 100, the timing controller 140 loads parameters necessary for driving the display panel 110 and then drives the display. In this case, the parameters necessary for driving the display panel 110 may include information about the sensing and compensation for characteristic values previously performed on the display panel 110. In the parameter loading process, the sensing of characteristic values (threshold voltage and mobility) of the driving transistor DRT may be performed. As described above, a process in which the characteristic value is sensed in the parameter loading process after the power-on signal is generated and before the subpixel emits light is referred to as an on-sensing process.

Alternatively, a period in which the characteristic value of the driving transistor DRT is sensed may proceed after a power-off signal of the display device 100 is generated. For example, when a power-off signal is generated in the display device 100, the timing controller 140 may cut off the data voltage supplied to the display panel 110 and may sense the characteristic value of the driving transistor DRT for a predetermined time. As such, a process in which sensing of the characteristic value is performed in a state in which the data voltage is cut off as a power-off signal is generated so that emission of the subpixel is terminated is referred to as an off-sensing process.

Further, the sensing period for the characteristic value of the driving transistor DRT may be performed in real time while the display is driven. This sensing process is referred to as a real-time (RT) sensing process. In the real-time sensing process, the sensing process may be performed on one or more subpixels SP in one or more subpixel SP lines, each blank period during the display driving period.

In other words, during the display driving period when an image is displayed on the display panel 110, a blank period in which the data voltage is not supplied to the subpixel SP exists within one frame or between the nth frame and the n+1th frame and, in the blank period, mobility sensing for one or more subpixels SP may be performed.

As such, when the sensing process is performed in the blank period, the subpixel (SP) line on which the sensing process is performed may be randomly selected. Accordingly, after the sensing process in the blank section is performed, an abnormality that may appear in the display driving period may be alleviated. After the sensing process is performed during the blank period, the compensated data voltage may be supplied to the subpixels SP where the sensing process has been performed during the display driving period. Accordingly, abnormalities in the subpixel SP line where the sensing process has been completed in the display driving period after the sensing process in the blank period may be further alleviated.

The data driving circuit 130 may include a data voltage output circuit 136 including a latch circuit, a digital-to-analog converter DAC, and an output buffer BUF and, in some cases, the data driving circuit 130 may further include an analog-to-digital converter ADC and various switches SAM, SPRE, and RPRE. Alternatively, the analog-to-digital converter ADC and various switches SAM, SPRE, and RPRE may be positioned outside the data driving circuit 130.

The compensation circuit COMP may be present inside or outside the timing controller 140. The memory MEM may be positioned outside the timing controller 140 or may be implemented, in the form of a register, inside the timing controller 140.

Figure 5:
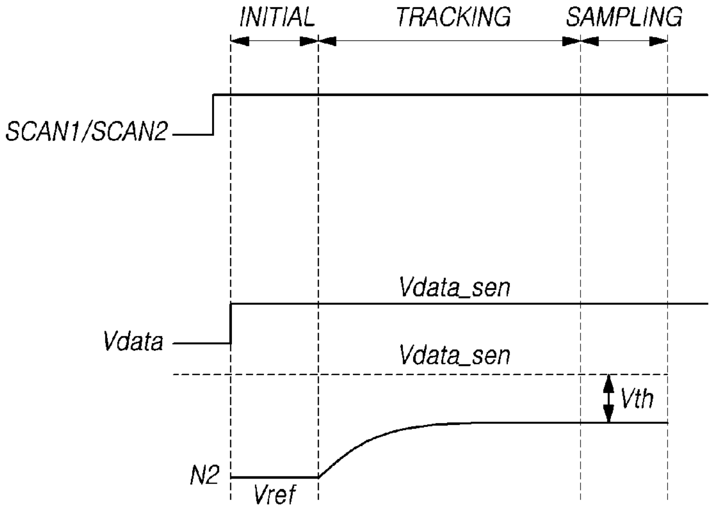
FIG. 5 is a signal timing diagram illustrating an example of external compensation for a threshold voltage of a driving transistor in a display device according to embodiments of the disclosure.

FIG. 5 is a signal timing diagram illustrating an example of external compensation for a threshold voltage of a driving transistor in a display device according to embodiments of the disclosure.

Referring to FIG. 5, the sensing of the threshold voltage Vth of the driving transistor DRT in the display device 100 according to embodiments of the disclosure may be performed in an initialization phase INITIAL, a tracking phase TRACKING, and a sampling phase SAMPLING.

In this case, since the scan transistor SCT and the sensing transistor SENT are simultaneously turned on and turned off for sensing the threshold voltage Vth of the driving transistor DRT, the first scan signal SCAN1 and the second scan signal SCAN2 together may be applied through one gate line GL, or the first scan signal SCAN1 and the second scan signal SCAN2 may be applied at the same time through different gate lines GL.

The initialization phase INITIAL is a period in which the second node N2 of the driving transistor DRT is charged with the reference voltage Vref for sensing the threshold voltage Vth of the driving transistor DRT, and the first scan signal SCAN1 and the second scan signal SCAN2 which have high levels may be applied through the gate line GL.

The tracking phase TRACKING is a period in which charges are charged to the storage capacitor Cst after the charging of the second node N2 of the driving transistor DRT is completed.

The sampling phase SAMPLING is a period in which a current flowed by the charge charged to the storage capacitor Cst is detected after the storage capacitor Cst of the driving transistor DRT is charged.

If the first scan signal SCAN1 and the second scan signal SCAN2 of the turn-on level are simultaneously applied in the initialization phase INITIAL, the scan transistor SCT is turned on. Accordingly, the first node N1 of the driving transistor DRT is initialized to the sensing data voltage Vdata_sen for sensing the threshold voltage Vth.

The sensing transistor SENT is also turned on by the first scan signal SCANT and the second scan signal SCAN2 of the turn-on level, and the reference voltage Vref is applied through the reference voltage line RVL, so that the second node N2 of the driving transistor DRT is initialized to the reference voltage Vref.

In the tracking phase TRACKING, the voltage of the second node N2 of the driving transistor DRT reflecting the threshold voltage Vth of the driving transistor DRT is tracked. To this end, in the tracking phase TRACKING, the scan transistor SCT and the sensing transistor SENT may remain in the turned-on state, and the reference voltage Vref applied through the reference voltage line RVL is cut off.

Accordingly, the second node N2 of the driving transistor DRT may float, and the voltage of the second node N2 voltage of the driving transistor DRT starts to rise from the reference voltage Vref. In this case, since the sensing transistor SENT is on, the increase in the voltage of the second node N2 of the driving transistor DRT leads to an increase in the voltage of the reference voltage line RVL.

In this process, the voltage of the second node N2 of the driving transistor DRT is increased and then saturated. The saturation voltage at the time when the second node N2 of the driving transistor DRT reaches the saturated state may correspond to the difference (Vdata_sen−Vth) between the sensing data voltage Vdata_sen for sensing the threshold voltage Vth and the threshold voltage Vth of the driving transistor DRT.

In the sampling phase SAMPLING, the high-level first scan signal SCAN1 and second scan signal SCAN2 to the gate line GL is maintained, and the charge charged in the storage capacitor Cst of the driving transistor DRT is sensed by the characteristic value sensing circuit included in the data driving circuit 130.

Figure 6:
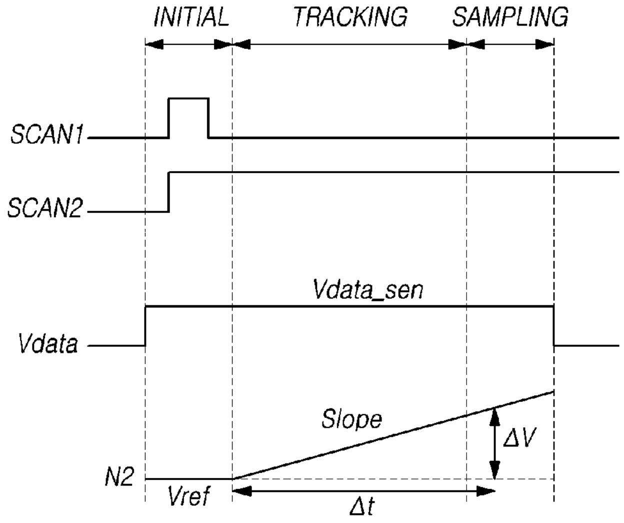
FIG. 6 is a signal timing diagram illustrating an example of external compensation for a mobility of a driving transistor in a display device according to embodiments of the disclosure.

FIG. 6 is a signal timing diagram illustrating an example of external compensation for a mobility of a driving transistor in a display device according to embodiments of the disclosure.

Referring to FIG. 6, like the sensing of the threshold voltage Vth, the sensing of the mobility of the driving transistor DRT in the display device 100 according to embodiments of the disclosure may be performed in an initialization phase INITIAL, a tracking phase TRACKING, and a sampling phase SAMPLING.

In the initialization phase INITIAL, the scan transistor SCT may be turned on by the first scan signal SCAN1 of the turn-on level, so that the first node N1 of the driving transistor DRT is initialized to the sensing data voltage Vdata_sen for mobility sensing. Further, the sensing transistor SENT is turned on by the second scan signal SCAN2 of the turn-on level and, in this state, the second node N2 of the driving transistor DRT is initialized to the reference voltage Vref.

The tracking phase TRACKING is a phase for tracking the mobility of the driving transistor DRT. The mobility of the driving transistor DRT may indicate the current driving capability of the driving transistor DRT, and the voltage of the second node N2 of the driving transistor DRT capable of calculating the mobility of the driving transistor DRT is tracked through the tracking phase TRACKING.

In the tracking phase TRACKING, the scan transistor SCT is turned off by the first scan signal SCAN1 of the turn-off level, and the switch where the reference voltage Vref is applied is cut off. Accordingly, both the first node N1 and the second node N2 of the driving transistor DRT float, and the voltages of the first node N1 and the second node N2 of the driving transistor DRT, both, increase.

In particular, since the voltage of the second node N2 of the driving transistor DRT is initialized to the reference voltage Vref, it starts to increase from the reference voltage Vref. In this case, since the sensing transistor SENT is on, the increase in the voltage of the second node N2 of the driving transistor DRT leads to an increase in the voltage of the reference voltage line RVL.

In the sampling phase SAMPLING, the characteristic value sensing circuit detects the voltage of the second node N2 of the driving transistor DRT, a predetermined time Δt after the voltage of the second node N2 starts to increase.

In this case, the sensing voltage detected by the characteristic value sensing circuit indicates a voltage Vref+ΔV which is the reference voltage Vref plus a predetermined voltage ΔV, and the mobility of the driving transistor DRT may be calculated based on the so-detected sensing voltage Vref+ΔV, the reference voltage Vref which is already known, and the increment time Δt of the voltage of the second node N2.

In other words, the mobility of the driving transistor DRT is proportional to the voltage variation ΔV/Δt per unit time of the reference voltage line RVL through the tracking phase TRACKING and the sampling phase SAMPLING. Accordingly, the mobility of the driving transistor DRT will be proportional to the slope of the voltage waveform of the reference voltage line RVL.

Figure 7:
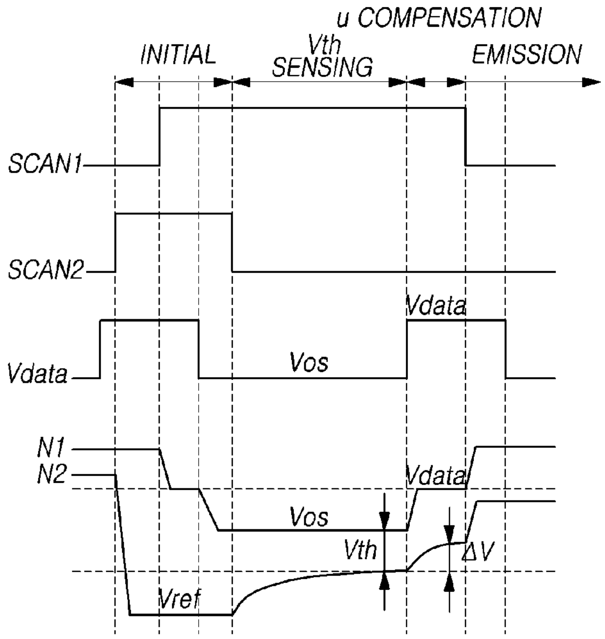
FIG. 7 is a signal timing diagram illustrating an example of internal compensation for a threshold voltage and mobility of a driving transistor in a display device according to embodiments of the disclosure.

FIG. 7 is a signal timing diagram illustrating an example of internal compensation for a threshold voltage and mobility of a driving transistor in a display device according to embodiments of the disclosure.

Referring to FIG. 7, the internal compensation for the characteristic value of the driving transistor DRT in the display device 100 according to embodiments of the disclosure may proceed in an initialization phase INITIAL, a threshold voltage sensing phase Vth SENSING, a mobility compensation phase u COMPENSATION, and a light emission phase EMISSION.

In the initialization phase INITIAL, a high-level second scan signal SCAN2 is input to turn on the sensing transistor SENT, thereby initializing the voltage of the second node N2, that is, the source node voltage of the driving transistor DRT, to a reference voltage Vref.

Thereafter, the high-level first scan signal SCAN1 is supplied to turn on the scan transistor SCT, and the data voltage Vdata is supplied to the first node N1, i.e., the gate node of the driving transistor DRT to turn on the driving transistor DRT. Subsequently, if the data voltage Vdata is lowered to the level of the offset voltage Vos, the voltage of the first node N1 becomes the level of the offset voltage Vos.

If the low-level second scan signal SCAN2 is applied to turn off the sensing transistor SENT in the threshold voltage sensing phase Vth SENSING, the voltage of the second node N2 rises up to the voltage of the difference between the offset voltage Vos and the threshold voltage Vth of the driving transistor DRT through the driving transistor DRT, so that the storage capacitor Cst is charged with the voltage of the threshold voltage Vth level.

In the mobility compensating phase u COMPENSATION, the first node N1 is raised to the level of the data voltage Vdata by applying the grayscale to be displayed through the display panel 110, that is, the corresponding data voltage Vdata. Accordingly, the second node N2 is gradually charged according to the mobility (u) characteristic of the driving transistor DRT, and as a result, the storage capacitor Cst stores the difference voltage which is the sum of the data voltage Vdata and the threshold voltage Vth minus the voltage variation ΔV according to the offset voltage Vos and the mobility u.

In the light emission phase EMISSION, a low-level first scan signal SCAN1 is applied to turn off the scan transistor SCT, so that the driving transistor DRT applies the current where the threshold voltage Vth and mobility u have been corrected to the light emitting diode EL by the voltage level stored in the storage capacitor Cst.

Such internal compensation or external compensation may be performed after a power-on signal is generated in the display device 100 and before display driving starts. For example, if a power-on signal is applied to the display device 100, the timing controller 140 loads parameters necessary for driving the display panel 110 and then drives the display.

In this case, since the threshold voltage sensing of the driving transistor DRT may take a long time as saturation of the voltage of the second node N2 of the driving transistor DRT takes long, the sensing and compensation of the threshold voltage Vth and performed primarily as an off-sensing process. In contrast, since the mobility sensing of the driving transistor DRT takes a relatively short time as compared to the threshold voltage sensing process, the mobility sensing and compensation may be performed as a real-time sensing process.

As such, the threshold voltage or mobility of the driving transistors DRT constituting the subpixels SP may vary depending on the driving time, or a deviation may occur due to the driving time difference of each subpixel. As a result, since the luminance of the subpixel SP varies depending on the characteristic value of the driving transistor DRT, the characteristic value of the driving transistor DRT may be regarded as the characteristic value of the subpixel SP.

A plurality of pixels may be disposed in a predetermined arrangement on the display panel 110. Each pixel may include a plurality of subpixels SP that emit light of different colors.

Figure 8:
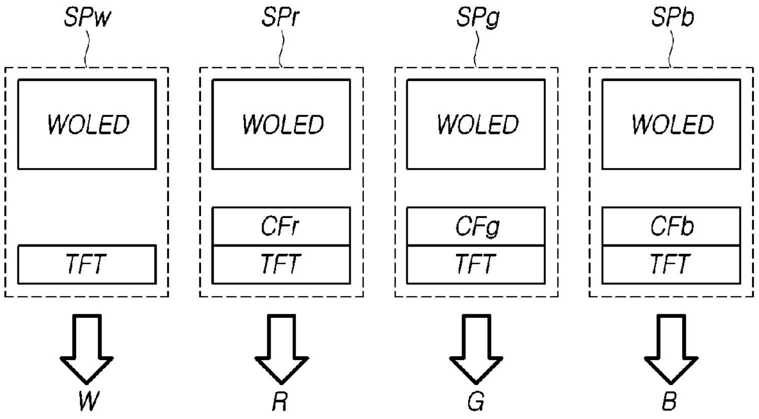
FIG. 8 is a layer view schematically illustrating a cross-sectional structure of a pixel including a plurality of subpixels in a display device according to embodiments of the disclosure.

FIG. 8 is a layer view schematically illustrating a cross-sectional structure of a pixel including a plurality of subpixels in a display device according to embodiments of the disclosure.

Referring to FIG. 8, in the display device 100 according to embodiments of the disclosure, the display panel 110 may have a pixel structure including a white subpixel SPw, a red subpixel SPr, a green subpixel SPg, and a blue subpixel SPb to prevent degradation of color and pure-color luminance while increasing the optical efficiency. In other words, one pixel may be composed of four subpixels SPw, SPr, SPg, and SPb including a white subpixel SPw, a red subpixel SPr, a green subpixel SPg, and a blue subpixel SPb.

In this case, the RGB subpixels SPr, SPg, and SPb may be referred to as colored subpixels, as distinguished from the white subpixel SPw. The colors of the subpixels SP constituting the pixel are not limited to white, red, green, and blue, and be varied according to the type of the display device 100.

One subpixel SP may include a scan transistor SCT, a sensing transistor SENT, a driving transistor DRT, a storage capacitor Cst, and a light emitting element ED. In the case of an organic light emitting display device, the light emitting element ED is formed of an organic light emitting diode, and operates to emit light according to the driving current formed by the driving transistor DRT.

The scan transistor SCT is switched so that the data voltage Vdata supplied through the data line DL is stored in the storage capacitor Cst in response to the first scan signal SCAN1 supplied through the gate line GL. The driving transistor DRT operates so that a driving current flows between the driving voltage EVDD and the base voltage EVSS according to the data voltage stored in the storage capacitor Cst.

The subpixel SP having such a configuration may be classified into a top-emission type, a bottom-emission type, or a dual-emission type according to a structure.

The WRGB subpixels SPw, SPr, SPg, and SPb may be implemented in a type in which a white organic light emitting diode (WOLED) and RGB color filters CFr, CFg, and CFb are used, or a type in which the light emitting materials contained in the organic light emitting diode are divided into WRGB colors.

In the type using a white organic light emitting diode (WOLED) and RGB color filters CFr, CFg, and CFb, the RGB subpixels SPr, SPg, and SPb may be formed of a transistor TFT, RGB color filters CFr, CFg, and CFb, and a white organic light emitting diode WOLED while the white subpixel SPw may be formed of a transistor TFT and a white organic light emitting diode WOLED.

In other words, the RGB subpixels SPr, SPg, and SPb include RGB color filters CFr, CFg, and CFb to convert the white color light transferred from the white organic light emitting diode WOLED into red, green, and blue light. In contrast, the white subpixel SPw may not include a color filter because it emits white light transferred from the white organic light emitting diode WOLED, as it is.

In the type using WRGB subpixels SPw, SPr, SPg, and SPb, unlike in the type in which red, green, and blue light emitting materials are independently deposited in the respective corresponding subpixels SP, a white light emitting material is deposited in all the subpixels SP, thus allowing for manufacture of a large-scale display panel even without using a fine metal mask, along with an increased lifespan and power savings.

The structure of the subpixel SP is described herein by taking an organic light emitting display as an example, but embodiments of the disclosure are not limited to the organic light emitting display, but may rather be applied to any display device white subpixels SPw and colored subpixels.

Figure 9:
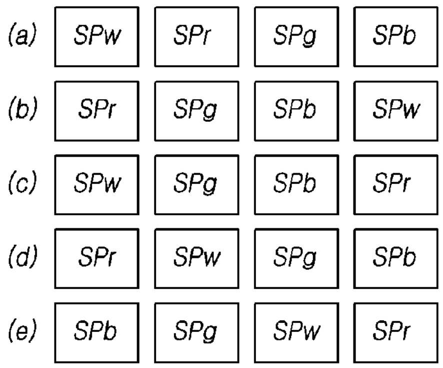
FIG. 9 is a view exemplarily illustrating an arrangement order of subpixels in a display device according to embodiments of the disclosure.

FIG. 9 is a view exemplarily illustrating an arrangement order of subpixels in a display device according to embodiments of the disclosure.

Referring to FIG. 9, in the display device 100 according to embodiments of the disclosure, the display panel 110 may have subpixels SP arranged in various manners to enhance color purity or color gamut while adjusting the target color coordinates.

For example, the display panel 110 may be configured so that the subpixels are arranged in the order of WRGB subpixels SPw, SPr, SPg, and SPb as in (a) or in the order of RGBW subpixels SPr, SPg, SPb, and SPw as in (b). Alternatively, the arrangement structure of the display panel 110 may be formed in the order of WGBR subpixels SPw, SPg, SPb, and SPr as in (c) and in the order of RWGB subpixels SPr, SPw, SPg, and SPb as in (d). Alternatively, the subpixels may be arranged in the order of BGWR subpixels SPb, SPg, SPw, and SPr. In addition to such arrangements, the display panel 110 may have white, red, green, and blue subpixels SPw, SPr, SPg, and SPb arranged in other various orders.

The display device 100 having this structure may allow all or some of the RGB subpixels SPr, SPg, and SPb, along with the white subpixel SPw, to emit light to represent desired color coordinates on the display panel 110, using the WRGB subpixels SPw, SPr, SPg, and SPb.

In such a structure where a plurality of subpixels SP displaying different colors form one pixel, the reference voltage line RVL for sensing the characteristic value of each subpixel SP, i.e., the threshold voltage or mobility of the driving transistor DRT, may be disposed between the subpixels SP.

Figure 10:
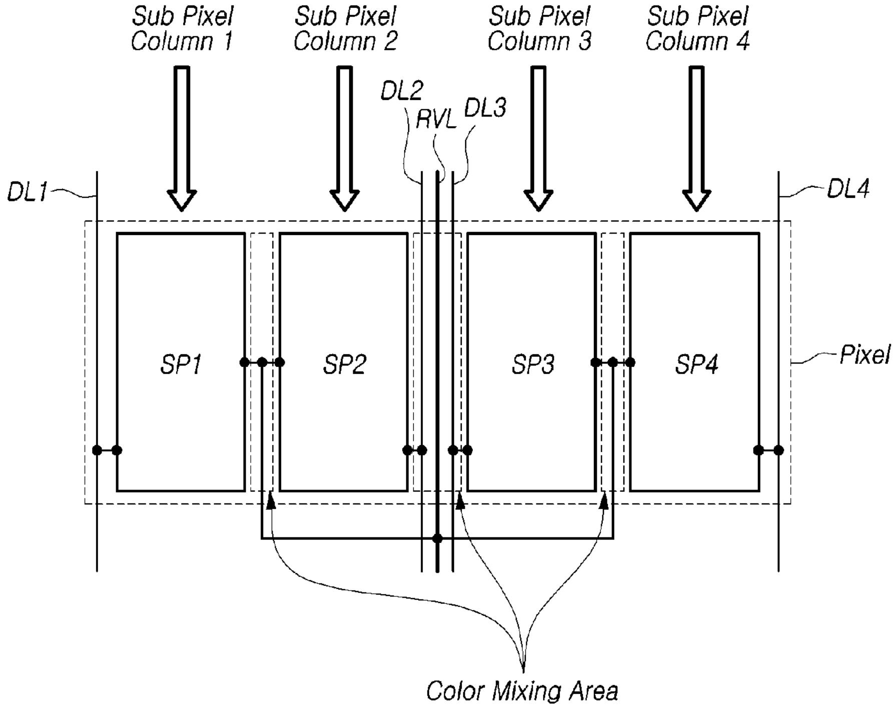
FIG. 10 is a view illustrating a structure in which a reference voltage line is disposed with respect to four subpixels in a display device.

FIG. 10 is a view illustrating a structure in which a reference voltage line is disposed with respect to four subpixels in a display device.

Referring to FIG. 10, the reference voltage line RVL of the display device 100 may correspond to a signal line in the column direction to transfer the display reference voltage VpreR corresponding to the common voltage during the display driving period or the sensing reference voltage VpreS during the sensing period for sensing the characteristic value of the driving transistor DRT.

In this case, the reference voltage lines RVL may be disposed, one for every subpixel SP or, for driving efficiency, one for every two or more subpixels SP.

What is illustrated herein is the case where the reference voltage lines RVL are disposed, one for every four subpixels SP among the cases where the reference voltage lines RVL are disposed, one for every two or more subpixels SP.

In this case, the four subpixels SP1, SP2, SP3, and SP4 whose characteristic values are sensed by one reference voltage line RVL will be four subpixels belonging to any one subpixel (SP) row for four subpixel (SP) columns.

The four subpixels SP1, SP2, SP3, and SP4 may include, e.g., a red subpixel SPr emitting red light, a white subpixel SPw emitting white light, a green subpixel SPg emitting green light, and a blue subpixel SPb emitting blue light. Accordingly, four subpixels SP1, SP2, SP3, and SP4 whose characteristic values are sensed by one reference voltage line RVL may constitute one pixel.

In other words, four subpixels SP1, SP2, SP3, and SP4 whose characteristic values are sensed by one reference voltage line RVL may constitute one pixel.

The four subpixels SP1, SP2, SP3, and SP4 are electrically connected to the four data lines DL1, DL2, DL3, and DL4, respectively. The four subpixels SP1, SP2, SP3, and SP4 are jointly connected to one reference voltage line RVL. In other words, one reference voltage line RVL may be disposed in the central area of the pixel to be shared by the four subpixels SP1, SP2, SP3, and SP4.

In this case, the driving transistors DRT corresponding to the four subpixels SP1, SP2, SP3, and SP4 may commonly receive the reference voltage Vref through one reference voltage line RVL.

In this case, since the process of sensing the characteristic value of the subpixel SP, that is, the characteristic value of the driving transistor DRT, through the reference voltage line RVL, is performed individually for each subpixel SP, the number of times of the subpixel (SP) characteristic value sensing process performed on a per-row basis is identical to the number of subpixels disposed in one row.

However, since the number of subpixels SP increases as the resolution of the display device 100 increases, the sensing time for sensing the characteristic values of the subpixels SP increases as the resolution of the display device 100 increases.

Further, when subpixels SP of different colors are disposed in one row, a color mixing area needs to be formed to prevent different colors of light from being mixed, between the subpixels SP.

The aperture ratio of the display panel 110 may be deteriorated due to the color mixing area between the subpixels SP and an increase in the number of subpixels due to an increase in the resolution of the display device 100.

The disclosure provides a display panel 110, a display device 100, and a display driving method capable of enhancing the aperture ratio by reducing the color mixing area and shortening the subpixel (SP) characteristic value sensing time through an efficient arrangement structure of subpixels SP and reference voltage lines RVL for characteristic value sensing.

Figure 11:
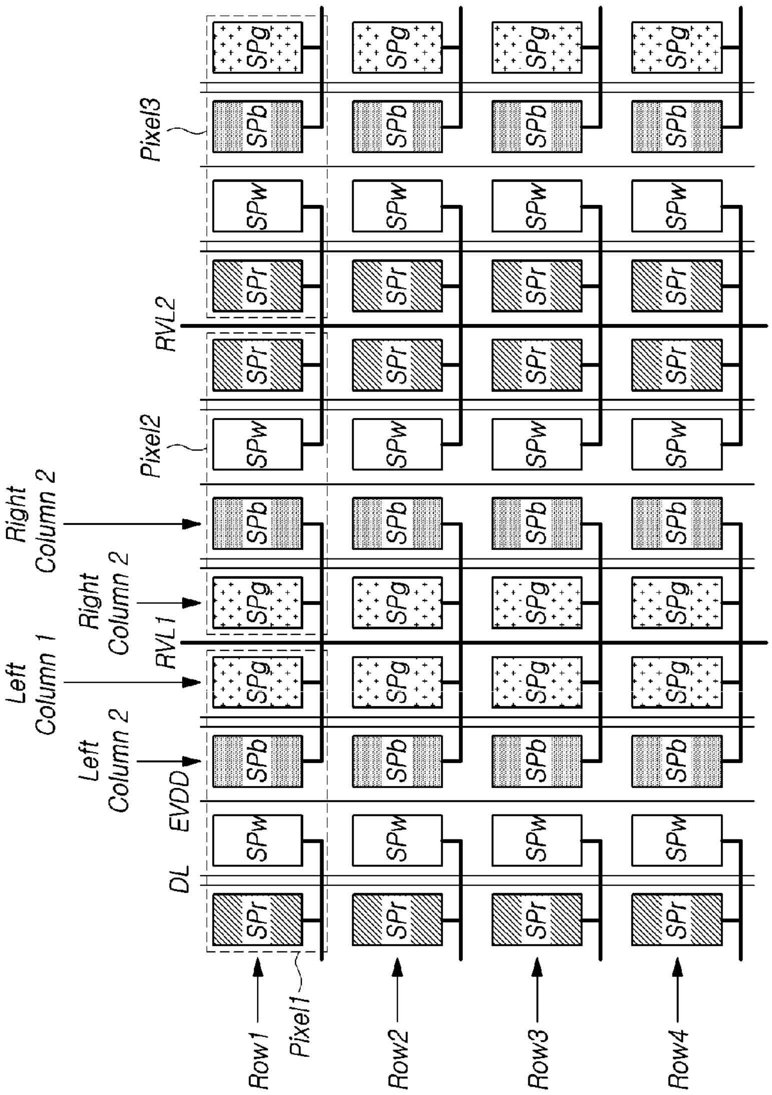
FIG. 11 is a view illustrating an example of a structure in which a reference voltage line and a subpixel are disposed in a display device according to embodiments of the disclosure.

FIG. 11 is a view illustrating an example of a structure in which a reference voltage line and a subpixel are disposed in a display device according to embodiments of the disclosure.

Referring to FIG. 11, in the display device 100 according to embodiments of the disclosure, the reference voltage line RVL may be disposed between pixels including a plurality of subpixels SP.

For example, when one pixel in a first row Row1 of the display panel 110 includes four subpixels including a red subpixel SPr, a white subpixel SPw, a green subpixel SPg, and a blue subpixel SPb, a first reference voltage line RVL1 may be positioned between a first pixel Pixel1 and a second pixel Pixel2.

In this case, the first reference voltage line RVL1 may be electrically connected to two subpixels adjacent to the first reference voltage line RVL1 among the four subpixels constituting the first pixel Pixel1 and two subpixels adjacent to the first reference voltage line RVL1 among the four subpixels constituting the second pixel Pixel2.

Accordingly, the first reference voltage line RVL1 may sense the two subpixels of the first pixel Pixel1, adjacent to the first reference voltage line RVL1, and the two subpixels of the second pixel Pixel2, adjacent to the first reference voltage line RVL1.

In this case, in the display device 100 of the disclosure, subpixels of the same color are symmetrically disposed with respect to the reference voltage line RVL so as to efficiently sense the characteristic value through the reference voltage line RVL, and the characteristic value sensing processes for subpixels of the same color are simultaneously performed.

For example, when a green subpixel SPg is positioned in the first left column closest, to the left, to the first reference voltage line RVL1, a green subpixel SPg is also positioned in the first right column positioned symmetrical thereto.

Accordingly, the green subpixel SPg of the first pixel Pixel1 and the green subpixel SPg of the second pixel Pixel2 are disposed in positions symmetrical with respect to the first reference voltage line RVL1.

Further, when a blue subpixel SPb is positioned in the second left column second closest, to the left, to the first reference voltage line RVL1, a blue subpixel SPb is also positioned in the second right column positioned symmetrical thereto.

Accordingly, the blue subpixel SPb of the first pixel Pixel1 and the blue subpixel SPb of the second pixel Pixel2 are disposed in positions symmetrical with respect to the first reference voltage line RVL1.

As a result, the first pixel Pixel1 and the second pixel Pixel2 disposed on the left and right sides of the first reference voltage line RVL1 are disposed in a structure in which subpixels are symmetrical with respect to the first reference voltage line RVL1.

In this state, the first reference voltage line RVL1 may be electrically connected to the blue subpixel SPb positioned in the second left column, the green subpixel SPg positioned in the first left column, the green subpixel SPg positioned in the first right column, and the blue subpixel SPb positioned in the second right column.

As described above, as characteristic value sensing is simultaneously performed on the subpixels of the same color in a state in which the first reference voltage line RVL1 is connected to the two green subpixels SPg and the two blue subpixels SPb, the characteristic value sensing time may be reduced by half.

In general, since the subpixels SP of the same color have substantially the same degree of degradation according to the driving time and substantially the same deviation according to the manufacturing process, they exhibit the same level of characteristic value change.

Accordingly, the display device 100 of the disclosure may simultaneously sense the characteristic values of two subpixels displaying the same color and determine the average value for the signals simultaneously sensed, as the characteristic value for the corresponding color.

Further, when a second reference voltage line RVL2 is disposed between a second pixel Pixel2 and a third pixel Pixel3, the subpixels constituting the second pixel Pixel2 and the subpixels constituting third pixel Pixel3 may also be disposed symmetrical with respect to the second reference voltage line RVL2.

As such, the structure in which subpixels of the same color are symmetrically disposed with respect to the reference voltage line RVL1 or RVL2 may be identically formed for each row Row1 Row2, Row3, and Row4 of the display panel 110. In this case, all the pixels positioned in the same column will have the same subpixel structure.

However, when the subpixels of the same color are disposed in the column direction, the same color is displayed in the vertical, column direction, so that the user's visibility of a specific color may deteriorate.

In this structure, the subpixels positioned in the first left column and the first right column with respect to the reference voltage line RVL1 or RVL2 display the same color while being adjacent to each other, so that a color mixing area for preventing color mixing may be omitted in the area where the reference voltage line RVL1 or RVL2.

Accordingly, in the display device 100 of the disclosure, subpixels SP of the same color may be symmetrically disposed with respect to the reference voltage line RVL for characteristic value sensing, and the compensation values for the subpixels of the same color are simultaneously sensed, so that the subpixel (SP) characteristic value sensing time may be reduced. Further, in the display device 100 of the disclosure, as a color mixing area is omitted from the area where the reference voltage line RVL is positioned, the aperture ratio may be increased.

In the display device 100 of the disclosure, subpixels of the same color are disposed symmetrical with respect to the reference voltage line RVL, and the colors of the subpixels disposed in the column direction are alternately disposed at regular intervals.

Figure 12:
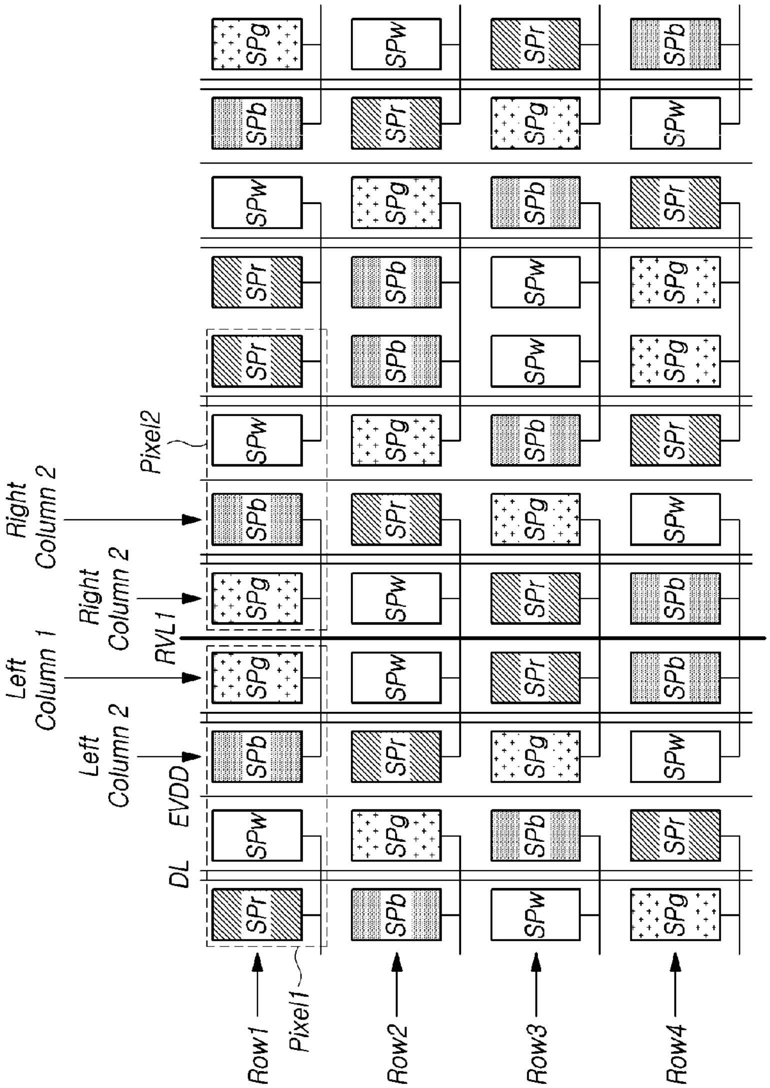
FIG. 12 is a view illustrating another example of a structure in which a reference voltage line and a subpixel are disposed in a display device according to embodiments of the disclosure.

FIG. 12 is a view illustrating another example of a structure in which a reference voltage line and a subpixel are disposed in a display device according to embodiments of the disclosure.

Referring to FIG. 12, in the display device 100 according to embodiments of the disclosure, the reference voltage line RVL is disposed between pixels including a plurality of subpixels SP.

For example, when one pixel in a first row Row1 of the display panel 110 includes four subpixels including a red subpixel SPr, a white subpixel SPw, a green subpixel SPg, and a blue subpixel SPb, a first reference voltage line RVL1 may be positioned between a first pixel Pixel1 and a second pixel Pixel2.

In this case, the first pixel Pixel1 and the second pixel Pixel2 disposed on the left and right sides of the first reference voltage line RVL1 are disposed in a structure in which subpixels are symmetrical with respect to the first reference voltage line RVL1.

Accordingly, the display device 100 of the disclosure may simultaneously sense the characteristic values of two subpixels displaying the same color and determine the average value for the signals simultaneously sensed, as the characteristic value for the corresponding color.

As such, the structure in which subpixels of the same color are symmetrically disposed with respect to the reference voltage line RVL may be varied in position, every row Row1, Row2, Row3, and Row4 of the display panel 110. In this case, the colors of the subpixels disposed in the same column may be changed according to a predetermined order within the range of maintaining the structure in which subpixels of the same color are symmetrically disposed with respect to the reference voltage line RVL.

For example, in the first row Row1, the RWBG subpixels may be disposed on the left side of the first reference voltage line RVL1, and the GBWR subpixels may disposed on the right side of the first reference voltage line RVL1 whereas in the second row Row2, the BGRW subpixels may be disposed on the left side of the first reference voltage line RVL1, and the WRGB subpixels may be disposed on the right side of the first reference voltage line RVL1. Further, in the third row Row3, the WBGR subpixels may be disposed on the left side of the first reference voltage line RVL1, and the RGBW subpixels may disposed on the right side of the first reference voltage line RVL1 whereas in the fourth row Row4, the GRWB subpixels may be disposed on the left side of the first reference voltage line RVL1, and the BWRG subpixels may be disposed on the right side of the first reference voltage line RVL1.

In this case, in the column direction, subpixels of the same color will be sequentially disposed every four rows.

As such, when the subpixels are disposed so that the colors of the subpixels disposed in the same column are varied according to a predetermined order, the user's visibility may be enhanced as compared to when the subpixels of the same color are disposed in the column direction.

Further, the subpixels positioned in the first left column and the first right column with respect to the reference voltage line RVL display the same color while being adjacent to each other, so that a color mixing area for preventing color mixing may be omitted in the area where the reference voltage line RVL.

Accordingly, in the display device 100 of the disclosure, subpixels SP of the same color may be symmetrically disposed with respect to the reference voltage line RVL for characteristic value sensing, and the compensation values for the subpixels of the same color are simultaneously sensed, so that the subpixel (SP) characteristic value sensing time may be reduced. Further, in the display device 100 of the disclosure, as a color mixing area is omitted from the area where the reference voltage line RVL is positioned, the aperture ratio may be increased.

Figure 13:
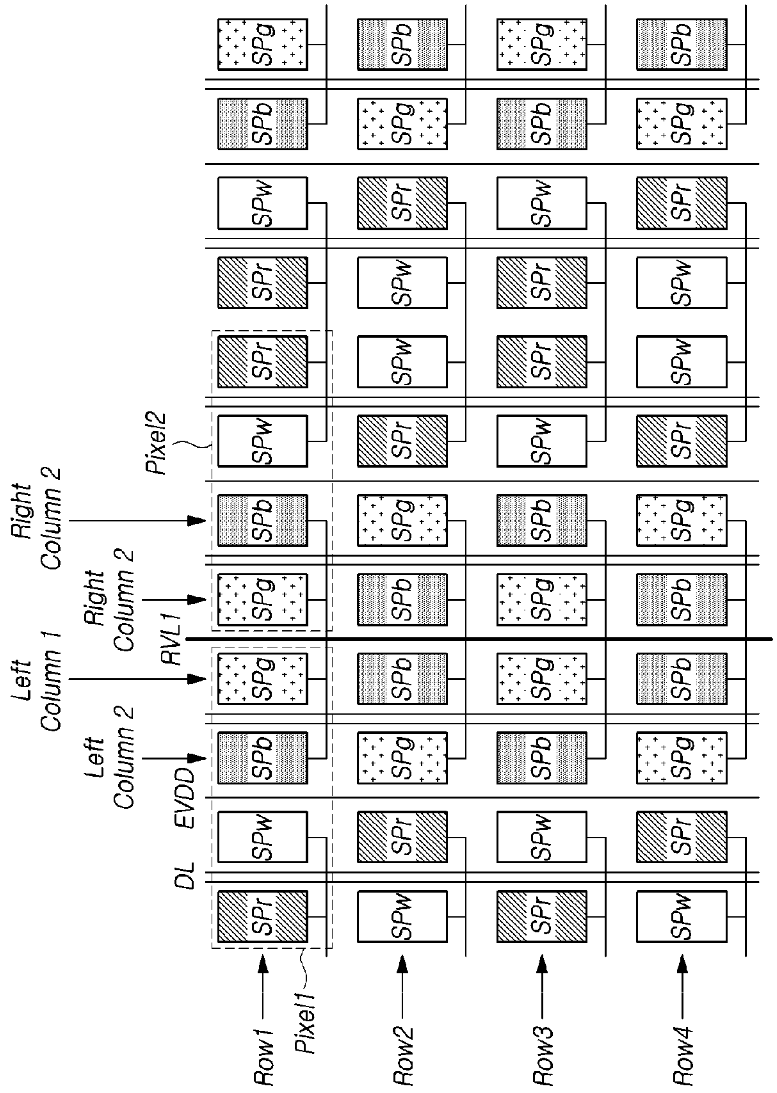
FIG. 13 is a view illustrating another example of a structure in which a reference voltage line and a subpixel are disposed in a display device according to embodiments of the disclosure.

FIG. 13 is a view illustrating another example of a structure in which a reference voltage line and a subpixel are disposed in a display device according to embodiments of the disclosure.

Referring to FIG. 13, in the display device 100 according to embodiments of the disclosure, the reference voltage line RVL is disposed between pixels including a plurality of subpixels SP.

For example, when one pixel in a first row Row1 of the display panel 110 includes four subpixels including a red subpixel SPr, a white subpixel SPw, a green subpixel SPg, and a blue subpixel SPb, a first reference voltage line RVL1 may be positioned between a first pixel Pixel1 and a second pixel Pixel2.

In this case, the first pixel Pixel1 and the second pixel Pixel2 disposed on the left and right sides of the first reference voltage line RVL1 are disposed in a structure in which subpixels are symmetrical with respect to the first reference voltage line RVL1.

Accordingly, the display device 100 of the disclosure may simultaneously sense the characteristic values of two subpixels displaying the same color and determine the average value for the signals simultaneously sensed, as the characteristic value for the corresponding color.

As such, the structure in which subpixels of the same color are symmetrically disposed with respect to the reference voltage line RVL may be varied in position, every two rows, e.g., the first row Row1 and the second row Row2, of the display panel 110. In this case, the colors of the subpixels disposed in the same column may be changed, every two rows, within the range of maintaining the structure in which subpixels of the same color are symmetrically disposed with respect to the reference voltage line RVL.

For example, in the odd-numbered row, the RWBG subpixels may be disposed on the left side of the first reference voltage line RVL1, and the GBWR subpixels may disposed on the right side of the first reference voltage line RVL1 whereas in the even-numbered row, the WRGB subpixels may be disposed on the left side of the first reference voltage line RVL1, and the BGRW subpixels may be disposed on the right side of the first reference voltage line RVL1.

In this case, in the column direction, subpixels of the same color will be sequentially disposed every two rows.

Further, the subpixels positioned in the first left column and the first right column, adjacent to each other, with respect to the reference voltage line RVL display the same color while being adjacent to each other, so that a color mixing area for preventing color mixing may be omitted in the area where the reference voltage line RVL.

Figure 14:
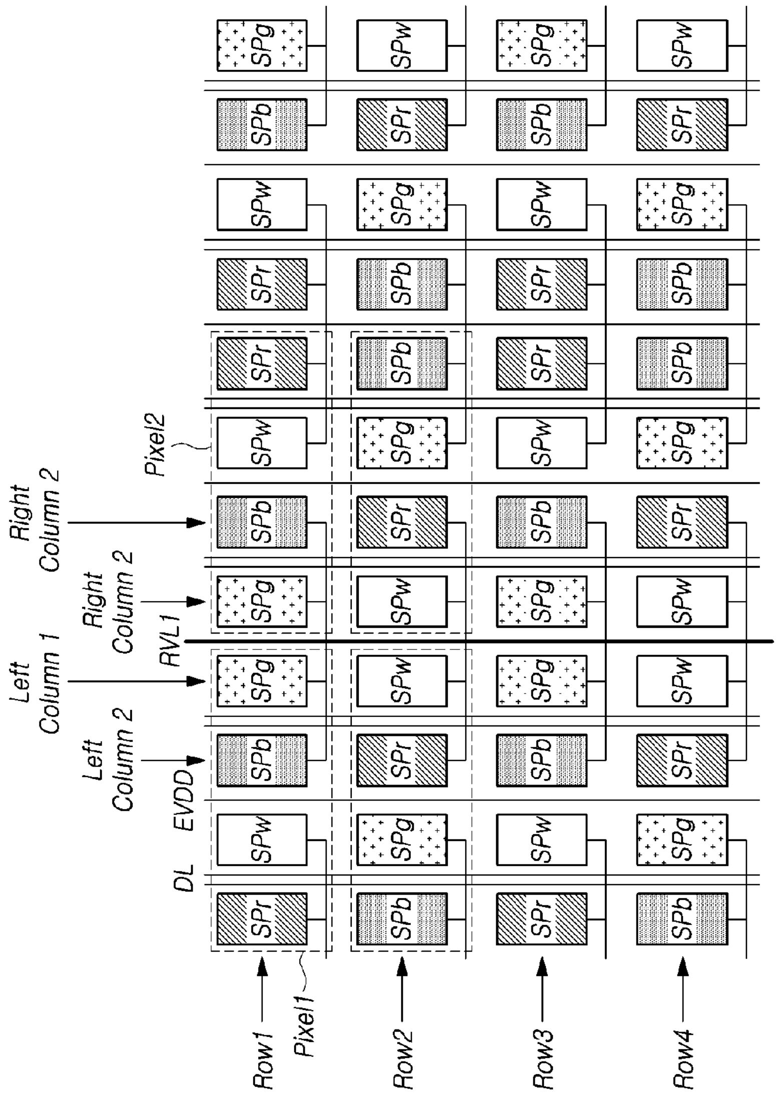
FIG. 14 is a view illustrating another example of a structure in which a reference voltage line and a subpixel are disposed in a display device according to embodiments of the disclosure.

FIG. 14 is a view illustrating another example of a structure in which a reference voltage line and a subpixel are disposed in a display device according to embodiments of the disclosure.

Referring to FIG. 14, in the display device 100 according to embodiments of the disclosure, the reference voltage line RVL is disposed between pixels including a plurality of subpixels SP.

For example, when one pixel in a first row Row1 of the display panel 110 includes four subpixels including a red subpixel SPr, a white subpixel SPw, a green subpixel SPg, and a blue subpixel SPb, a first reference voltage line RVL1 may be positioned between a first pixel Pixel1 and a second pixel Pixel2.

In this case, the first pixel Pixel1 and the second pixel Pixel2 disposed on the left and right sides of the first reference voltage line RVL1 are disposed in a structure in which subpixels are symmetrical with respect to the first reference voltage line RVL1.

Accordingly, the display device 100 of the disclosure may simultaneously sense the characteristic values of two subpixels displaying the same color and determine the average value for the signals simultaneously sensed, as the characteristic value for the corresponding color.

As such, the structure in which subpixels of the same color are symmetrically disposed with respect to the reference voltage line RVL may be alternately disposed every odd-numbered row and every even-numbered row. In this case, the colors of the subpixels disposed in the same column may be changed, every two rows, within the range of maintaining the structure in which subpixels of the same color are symmetrically disposed with respect to the reference voltage line RVL.

For example, in the odd-numbered row, the RWBG subpixels may be disposed on the left side of the first reference voltage line RVL1, and the GBWR subpixels may disposed on the right side of the first reference voltage line RVL1 whereas in the even-numbered row, the BGRW subpixels may be disposed on the left side of the first reference voltage line RVL1, and the WRGB subpixels may be disposed on the right side of the first reference voltage line RVL1.

In this case, in the column direction, subpixels of the same color will be sequentially disposed every two rows.

Further, the subpixels positioned in the first left column and the first right column, adjacent to each other, with respect to the reference voltage line RVL display the same color while being adjacent to each other, so that a color mixing area for preventing color mixing may be omitted in the area where the reference voltage line RVL.

Figure 15:
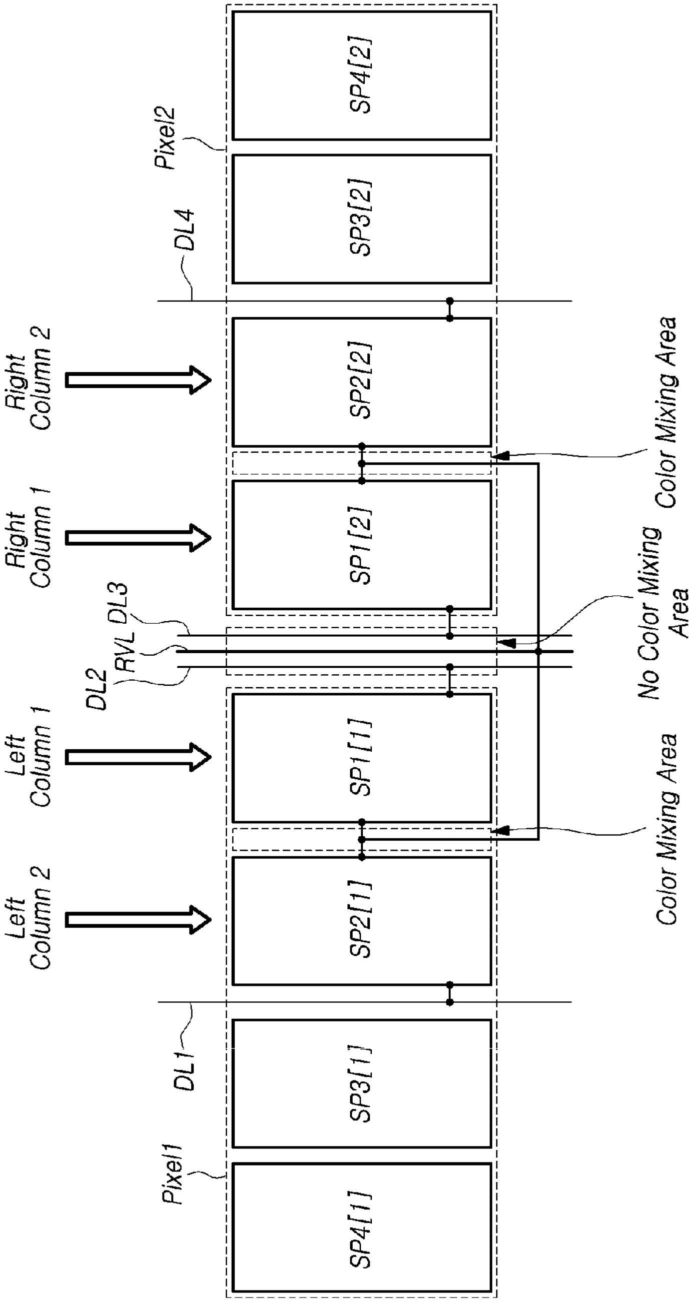
FIG. 15 is a view illustrating an example of a structure in which a reference voltage line and a color mixing area are disposed in a display device according to embodiments of the disclosure.

FIG. 15 is a view illustrating an example of a structure in which a reference voltage line and a color mixing area are disposed in a display device according to embodiments of the disclosure.

Referring to FIG. 15, the reference voltage line RVL in the display device 100 according to embodiments of the disclosure may correspond to a signal line in the column direction to transfer the display reference voltage VpreR corresponding to the common voltage during the display driving period or the sensing reference voltage VpreS during the sensing period for sensing the characteristic value of the driving transistor DRT.

In this case, the reference voltage lines RVL may be disposed, one for every subpixel SP or, for driving efficiency, one for every two or more subpixels SP.

What is illustrated herein is the case where the reference voltage lines RVL are disposed, one for every four subpixels SP among the cases where the reference voltage lines RVL are disposed, one for every two or more subpixels SP.

In this case, one reference voltage line RVL may be formed in a structure in which subpixels of the same color are symmetrically disposed between the pixels. For example, the reference voltage line RVL may be disposed between the first pixel Pixel1 and the second pixel Pixel2, and four subpixels SP1 [1]-SP4 [1] constituting the first pixel Pixel1 and the four subpixels SP1[2]-SP4[2] constituting the second pixel Pixel2 are positioned so that the ones of the same color are symmetrical with respect to the reference voltage line RVL.

In this case, the two subpixels SP1[1] and SP2[1] of the first pixel Pixel1, positioned in the first left column Left Column 1 and the second column Left Column 2 and the two subpixels SP1[2] and SP2[2] of the second pixel Pixel2, positioned in the first right column Right Column 1 and the second right column Right Column 2 may be connected to the reference voltage line RVL.

In this state, the characteristic value of each subpixel may be calculated by simultaneously detecting the characteristic values for the subpixels SP1[1] and SP1[2] in the first column, corresponding to the same color or simultaneously detecting the characteristic values for the subpixels SP2[1] and SP2[2] in the second column with respect to the reference voltage line RVL and averaging them.

In other words, the characteristic values of the two subpixels (e.g., SP1[1] and SP2[1]) of the first pixel Pixel1 and the two subpixels (e.g., SP1[2] and SP2[2]) of the second pixel Pixel2 may be detected through one reference voltage line RVL positioned between the two pixels Pixel1 and Pixel2.

In this case, the driving transistors DRT corresponding to the four subpixels SP1 [1], SP2 [1], SP1 [2], and SP2 [2] may commonly receive the reference voltage Vref through one reference voltage line RVL.

In this case, since the process of sensing the characteristic value of the subpixel SP, that is, the characteristic value of the driving transistor DRT, through the reference voltage line RVL, is performed simultaneously for the subpixels SP of the same color, the number of times of the subpixel (SP) characteristic value sensing process performed on a per-row basis is half the number of subpixels disposed in one row.

Further, since in the display device 100 of the disclosure, subpixels of the same color are disposed symmetrical with respect to the reference voltage line RVL, the area of the reference voltage line RVL adjacent to the subpixels SP of the same color may omit a color mixing area.

Accordingly, the display device 100 according to the disclosure may simultaneously sense the characteristic values of the subpixels of the same color, thereby reducing the time for sensing the characteristic values of the subpixels SP.

Further, the display device 100 of the disclosure may omit the color mixing area in the reference voltage line RVL in which subpixels of the same color are disposed adjacent to each other.

Figure 16:
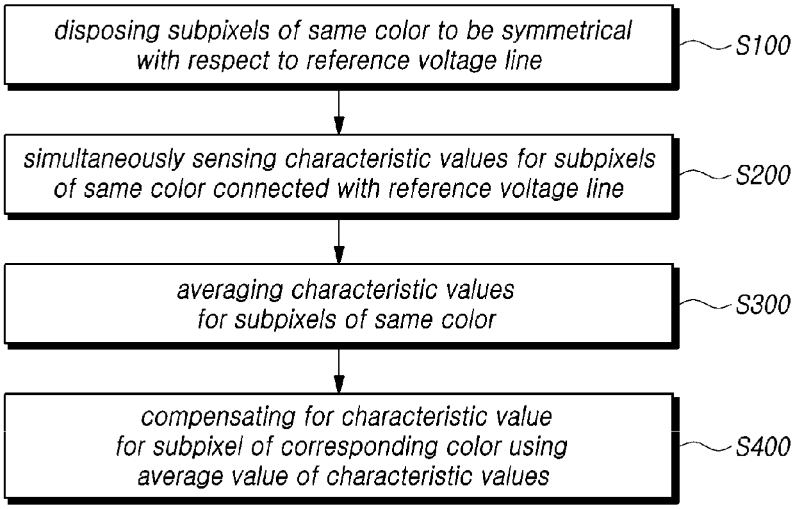
FIG. 16 is a flowchart illustrating a display driving method according to embodiments of the disclosure.

FIG. 16 is a flowchart illustrating a display driving method according to embodiments of the disclosure.

Referring to FIG. 16, a display driving method according to embodiments of the disclosure may include a step S100 of disposing subpixels of the same color symmetrically with respect to a reference voltage line RVL, a step S200 of simultaneously sensing characteristic values of the subpixels of the same color connected with the reference voltage line RVL, a step S300 of averaging the characteristic values of the subpixels of the same color, and a step S400 of compensating for a characteristic value for a subpixel of a corresponding color using the average of the characteristic values.

The step S100 of disposing the subpixels of the same color symmetrically with respect to the reference voltage line RVL is a process for configuring the display panel 110 so that the reference voltage line RVL is disposed between pixels Pixel and the subpixels of the same color are symmetrical with respect to the reference voltage line RVL.

In this case, in the structure in which subpixels of the same color are symmetrically disposed with respect to the reference voltage line RVL, the subpixels of the same color may be positioned, every row in the column direction, or alternately every odd-numbered row and every even-numbered row. Alternatively, when the subpixels of four colors (e.g., RGBW) constitute one pixel, the subpixels of the same color may be disposed every fourth row.

The step S200 of simultaneously sensing the characteristic values of the subpixels of the same color connected with the reference voltage line RVL is a process for simultaneously sensing the characteristic values for the subpixels of the same color among the plurality of subpixels connected to one reference voltage line RVL.

The process for sensing the characteristic value through the reference voltage line RVL may detect the voltage formed at the reference voltage line RVL by turning on the sampling switch SAM, a predetermined time after the time of floating the reference voltage line RVL by turning off the sensing reference switch SPRE.

In this case, the analog-to-digital converter ADC disposed in the data driving circuit 130 may detect the sensing voltage Vsen through the reference voltage line RVL connected by the sampling switch SAM and convert it into a sensing value in a digital signal form.

The step S300 of averaging the characteristic values of the subpixels of the same color is a process for determining that the average value (½) of the characteristic values simultaneously detected for two subpixels of the same color is the characteristic value of the individual subpixel, considering that the characteristic values for the subpixels of the same color disposed in adjacent positions with respect to the reference voltage line RVL are changed at the same level.

The step S400 of compensating for the characteristic values of the subpixels of the same color using the average value of the characteristic values is a process for determining that the average value (½) of the characteristic values simultaneously detected for two subpixels of the same color is the characteristic value of the individual subpixel and compensating for the characteristic value of the corresponding subpixel using the average value.

To that end, the timing controller 140 may compensate for the image data DATA to be supplied to the data driving circuit 130 by using the average value of the characteristic values and may provide the compensated image data DATA_comp to the data driving circuit 130.

The foregoing embodiments are briefly described below.

A display panel 110 of the disclosure may comprise a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto. The N subpixels may be disposed so that subpixels of a same color are symmetrical with respect to the sensing line.

The plurality of pixels may be disposed so that the subpixels of the same color are positioned in the second direction.

The plurality of pixels may be disposed so that the subpixels of the same color are positioned, every second position in the second direction.

The plurality of pixels may be disposed so that the subpixels of the same color are positioned, every Nth position in the second direction.

The plurality of sensing lines may be a reference voltage line RVL to which a display reference voltage VpreR is applied during a display driving period or a sensing reference voltage VpreS is applied during a characteristic value sensing period.

The plurality of sensing lines may be configured to simultaneously sense characteristic values in the subpixels of the same color.

In the display panel 110, a characteristic value of a corresponding subpixel may be compensated using an average value of the characteristic values simultaneously sensed in the subpixels of the same color.

In the display panel 110, a color mixing area may be formed in an area where subpixels of different colors are adjacent to each other, and the color mixing area may be omitted in an area where the subpixels of the same color are adjacent to each other.

The area where the subpixels of the same color are adjacent to each other may be an area where the sensing lines are disposed.

A display device 100 of the disclosure may comprise a display panel 110 including a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line, a data driving circuit 130 configured to supply a data voltage Vdata to the display panel 110 and sense the characteristic values for the plurality of subpixels through the plurality of sensing lines, and a timing controller 140 configured to control the data driving circuit 130 and apply compensation image data DATA_comp to a corresponding subpixel using the characteristic values sensed by the data driving circuit 130.

The plurality of sensing lines may be configured to simultaneously sense characteristic values in the subpixels of the same color.

The data driving circuit 130 may be configured to initialize the sensing line to a reference voltage and track the sensing line to sense a characteristic value charged to the sensing line after a predetermined time.

The timing controller 140 may be configured to generate the compensation image data to be supplied to the corresponding subpixel using an average value of characteristic values simultaneously sensed in the subpixels of the same color.

In the display device 100, a color mixing area may be formed in an area where subpixels of different colors are adjacent to each other, and the color mixing area may be omitted in an area where the subpixels of the same color are adjacent to each other.

A method for driving a display device including a display panel 110 including a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto, wherein the N subpixels are disposed so that subpixels of a same color are symmetrical with respect to the sensing line, may comprise disposing the subpixels of the same color to be symmetrical with respect to the sensing line (S100), simultaneously sensing characteristic values for the subpixels of the same color to which the sensing line is connected (S200), averaging the characteristic values for the subpixels of the same color (S300), and compensating for a characteristic value for a subpixel of a corresponding color using the average value of the characteristic values (S400).

The sensing S200 may include initializing the sensing line to a reference voltage and tracking the sensing line to sense a characteristic value charged to the sensing line after a predetermined time.

The compensating S400 may include generating and supplying compensation image data to be supplied to a corresponding subpixel using the average value.

It will be apparent to those skilled in the art that various modifications and variations can be made in the display panel, the display device, and the display driving method of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel comprising a plurality of pixels arranged in a matrix form, each of the plurality of pixels including N subpixels arranged in a first direction and having different colors, wherein N is 3 or 4, and a plurality of sensing lines disposed in a second direction between the plurality of pixels and configured to sense characteristic values for a plurality of subpixels electrically connected thereto; and a data driving circuit configured to supply a data voltage to the display panel and sense the characteristic values for the plurality of pixels through the plurality of sensing lines, wherein the N subpixels are disposed so that subpixels of a same color are symmetrical with respect to a corresponding sensing line among the plurality of sensing lines while the subpixels of the same color are connected to the corresponding sensing line together, and wherein the data driving circuit is configured to initialize the sensing line to a reference voltage, and track the sensing line to sense a characteristic value charged to the sensing line after a predetermined time.

2. The display device of claim 1, wherein the plurality of pixels are disposed so that the subpixels of the same color are positioned in the second direction.

3. The display device of claim 1, wherein the plurality of pixels are disposed so that the subpixels of the same color are positioned at every second position in the second direction.

4. The display device of claim 1, wherein the plurality of pixels are disposed so that the subpixels of the same color are positioned at every Nth position in the second direction.

5. The display device of claim 1, wherein the plurality of sensing lines are a reference voltage line to which a display reference voltage is applied during a display driving period or a sensing reference voltage is applied during a characteristic value sensing period.

6. The display device of claim 1, wherein the plurality of sensing lines are configured to simultaneously sense characteristic values in the subpixels of the same color.

7. The display device of claim 6, wherein a characteristic value of a corresponding subpixel is compensated using an average value of the characteristic values simultaneously sensed in the subpixels of the same color.

8. The display device of claim 1, wherein a color mixing area is formed in an area where subpixels of different colors are adjacent to each other, and wherein the color mixing area is omitted in an area where the subpixels of the same color are adjacent to each other.

9. The display device of claim 8, wherein the area where the subpixels of the same color are adjacent to each other is an area where the sensing lines are disposed.

10. A display device, comprising:

a display panel including a plurality of pixels arranged in a matrix form, each of the plurality of pixels including N subpixels arranged in a first direction and having different colors, wherein N is 3 or 4 and a plurality of sensing lines disposed in a second direction between the plurality of pixels and configured to sense characteristic values for a plurality of subpixels electrically connected thereto wherein the N subpixels are disposed so that subpixels of a same color are symmetrical with respect to the sensing line;

a data driving circuit configured to supply a data voltage to the display panel and sense the characteristic values for the plurality of subpixels through the plurality of sensing lines; and a timing controller configured to control the data driving circuit and apply compensation image data to a corresponding subpixel using the characteristic values sensed by the data driving circuit, wherein the data driving circuit is configured to:

initialize the sensing line to a reference voltage; and track the sensing line to sense a characteristic value charged to the sensing line after a predetermined time.

11. The display device of claim 10, wherein the plurality of sensing lines are configured to simultaneously sense characteristic values in the subpixels of the same color.

12. The display device of claim 11, wherein the timing controller is configured to generate the compensation image data to be supplied to the corresponding subpixel using an average value of characteristic values simultaneously sensed in the subpixels of the same color.

13. The display device of claim 10, wherein a color mixing area is formed in an area where subpixels of different colors are adjacent to each other, and wherein the color mixing area is omitted in an area where the subpixels of the same color are adjacent to each other.

14. A method for driving a display device including a plurality of pixels arranged in a matrix form, the method comprising:

disposing subpixels of a same color among a plurality of subpixels included in the plurality of pixels to be symmetrical with respect to a sensing line disposed between the plurality of pixels;

simultaneously sensing characteristic values for the subpixels of the same color to which the sensing line is connected;

averaging the characteristic values for the subpixels of the same color; and compensating for a characteristic value for a subpixel of a corresponding color using the average value of the characteristic values, wherein the sensing includes:

initializing the sensing line to a reference voltage; and tracking the sensing line to sense a characteristic value charged to the sensing line after a predetermined time.

15. The method of claim 14, wherein the compensating includes generating and supplying compensation image data to be supplied to a corresponding subpixel using the average value.

* * * * *